United States Patent
Jessen et al.

(10) Patent No.: US 9,968,889 B2
(45) Date of Patent: *May 15, 2018

(54) SPIRAL WOUND GAS FILTRATION MODULES AND COMPONENTS THEREOF

(71) Applicants: Fujifilm Manufacturing Europe B.V., Tilburg (NL); Fujifilm Corporation, Tokyo (JP)

(72) Inventors: Peter Jessen, Tilburg (NL); Yujiro Itami, Tilburg (NL)

(73) Assignees: Fujifilm Manufacturing Europe B.V. (NL); Fujifilm Corporation (JP)

(*) Notice: Subject to any disclaimer, the term of this patent is extended or adjusted under 35 U.S.C. 154(b) by 0 days. days.

This patent is subject to a terminal disclaimer.

(21) Appl. No.: 15/026,974

(22) PCT Filed: Sep. 30, 2014

(86) PCT No.: PCT/GB2014/052940
§ 371 (c)(1),
(2) Date: Apr. 3, 2016

(87) PCT Pub. No.: WO2015/049497
PCT Pub. Date: Apr. 9, 2015

(65) Prior Publication Data
US 2016/0256826 A1    Sep. 8, 2016

(30) Foreign Application Priority Data

Oct. 3, 2013 (GB) .................................. 1317514.6

(51) Int. Cl.
*B01D 53/22* (2006.01)
*B01D 63/10* (2006.01)
(Continued)

(52) U.S. Cl.
CPC ......... *B01D 63/103* (2013.01); *B01D 53/228* (2013.01); *B01D 65/003* (2013.01); *B01D 71/64* (2013.01); *B01D 2313/143* (2013.01)

(58) Field of Classification Search
CPC .... B01D 53/228; B01D 63/10; B01D 63/103; B01D 65/003; B01D 71/64; B01D 2313/04
See application file for complete search history.

(56) References Cited

U.S. PATENT DOCUMENTS 3,872,014 A    3/1975 Schell
3,899,309 A    8/1975 Hoehn et al.
(Continued)

FOREIGN PATENT DOCUMENTS

CN    101732997 A  *  6/2010    ............ B01D 63/10
CN    102838961 A     12/2012
(Continued)

OTHER PUBLICATIONS

International Preliminary Report on Patentability issued in corresponding International Application No. PCT/GB2014/052940, dated Apr. 5, 2016.
(Continued)

*Primary Examiner* — Jason M Greene
(74) *Attorney, Agent, or Firm* — Banner & Witcoff, Ltd.

(57) ABSTRACT

A membrane envelope stack for gas separation comprising membrane envelopes bonded together by means of an adhesive having a tensile E-modulus of at least 1600 N/mm² and/or an elongation at break of 20% or less and/or a Tg of at least 50° C.

18 Claims, 2 Drawing Sheets

(51) Int. Cl.
   *B01D 65/00* (2006.01)
   *B01D 71/64* (2006.01)

(56) References Cited

U.S. PATENT DOCUMENTS

| | | | |
|---|---|---|---|
| 4,464,494 A | | 8/1984 | King et al. |
| 4,717,394 A | | 1/1988 | Hayes |
| 5,034,126 A | * | 7/1991 | Reddy .................... B01D 53/22 |
| | | | 210/321.74 |
| 5,041,517 A | | 8/1991 | Vu et al. |
| 5,085,676 A | | 2/1992 | Ekiner et al. |
| 5,096,584 A | | 3/1992 | Reddy et al. |
| 5,108,604 A | * | 4/1992 | Robbins ................ B01D 63/10 |
| | | | 210/321.74 |
| 5,928,410 A | * | 7/1999 | Jois ..................... B01D 53/228 |
| | | | 55/DIG. 5 |
| 6,021,076 A | | 2/2000 | Woo et al. |
| 7,303,675 B2 | | 12/2007 | De La Cruz |
| 7,951,295 B2 | | 5/2011 | Larson et al. |
| 8,142,657 B2 | | 3/2012 | Larson et al. |
| 9,233,525 B2 | | 1/2016 | Wang et al. |
| 2008/0302719 A1 | * | 12/2008 | Chikura ................ B01D 63/10 |
| | | | 210/497.1 |
| 2009/0065426 A1 | * | 3/2009 | Ishii ..................... B01D 63/103 |
| | | | 210/457 |

FOREIGN PATENT DOCUMENTS

| | | |
|---|---|---|
| EP | 1971421 A1 | 9/2008 |
| JP | 2005224718 A | 8/2005 |
| JP | 2006136839 A | 6/2006 |
| WO | 2012/165455 A1 | 12/2012 |

OTHER PUBLICATIONS

International Search Report and Written Opinion issued in corresponding International Application No. PCT/GB2014/052940, dated Jan. 5, 2015.

* cited by examiner

_US 9,968,889 B2_

SPIRAL WOUND GAS FILTRATION MODULES AND COMPONENTS THEREOF

RELATED APPLICATION DATA

This application is a National Stage Application under 35 U.S.C. 371 of co-pending PCT application number PCT/GB2014/052940 designating the United States and filed Sep. 30, 2014; which claims the benefit of GB application number 1317514.6 and filed Oct. 3, 2013 each of which are hereby incorporated by reference in their entireties.

This invention relates to membrane envelope stacks for gas separation, to spiral wound gas filtration modules and to methods for their preparation and use for the separation of gases.

Spiral wound gas separation modules typically comprise one or more membrane envelopes, each envelope comprising a feed spacer sandwiched between two membrane sheets, or one membrane sheet folded around the feed spacer. The outside edges of the membrane sheets are typically sealed on all but two sides, e.g. using an adhesive seam, to provide the membrane envelope having two, opposite open ends. The open ends of each membrane envelope are then glued to the open ends of the next membrane envelope, creating a gas-tight seal between adjacent membrane envelopes while also ensuring that the open ends remains open so that feed gas may pass along the inside of the membrane envelope but not between the membrane envelopes. Typically a permeate carrier is included between each membrane envelope to keep them apart, thereby allowing any gas which permeates through the membrane to flow along the permeate carrier and into a central permeate collection tube.

Gas separation modules can be constructed by winding a stack of membrane envelopes around a perforated, central permeate collection tube, Optionally a permeate carrier is included between adjacent membrane envelopes, In use, the gas to be separated (or filtered) is introduced under pressure at one end face of the module and is allowed to travel axially along the module through the feed spacers inside the membrane envelopes. Because edges of adjacent membrane envelopes are adhered together with a gas-tight seal, the feed gas cannot enter the area between the membrane envelopes (typically containing a permeate carrier) without first passing through the membrane wall of the membrane envelope. As the feed gas flows axially through the module, along the feed spacer, the gas which permeates through the membrane sheet flows through the area between the membrane envelopes (e.g. through the permeate carrier) and to the permeate collection tube. Retentate which has not passed through the membranes is removed from the far end of the module. Permeate is removed through the far end of the permeate tube.

One of the problems with membrane envelope stacks used in gas separation is the undesirable formation of blisters. Membrane envelope stacks used for gas separation typically comprise membrane envelopes adhered together using an adhesive seam. The blisters typically appear after the first time the module containing the membrane envelope is used, often when the pressure of the gas feed is reduced. While not wishing to be bound by any theory, the present inventors believe that when such a membrane envelope stack is being used, the adhesive may absorb gas molecules when under high pressure. Then, when the pressure is reduced after use, the molecules of gas absorbed into the adhesive may expand to form blisters or other defects in the adhesive seal. The blisters can restrict or block the gas feed flow through the stack and the adhesive may crack, fail or flake-off, thereby restricting the flow of gas. Blisters can also lead to gas leaks, reducing the selectivity of the gas separation membrane modules.

U.S. Pat. No. 5,034,126 ('126) describes a method for preparing a spiral wound membrane which comprises adhesive seals. As noted in '126, the seals may burst under high pressure when the module is in use. However this technical problem of bursting in use is different from the problem addressed by the present invention where blistering occurs after pressure applied to the membrane is reduced.

U.S. Pat. No. 5,041,517 ('517) describes polyurethane adhesives and their use for bonding laminates of permeable membranes supported on nylon fabrics. According to '517, column 1, line 63, it is essential that the adhesive remains flexible when cured. '517 does not address the technical problem of blistering or propose any solution to this problem.

The present inventors have found that one may reduce the likelihood of blistering by using membrane envelopes as per the present invention.

According to a first aspect of the present invention there is provided a membrane envelope stack for gas separation comprising membrane envelopes bonded together by means of an adhesive having a tensile E-modulus of at least 1600 N/mm$^2$ and/or an elongation at break of 20% or less and/or a Tg of at least 50° C.

A second aspect of the present invention provides a spiral wound gas filtration module comprising a membrane envelope stack according to the first aspect of the present invention.

The term "comprising" is to be interpreted as specifying the presence of the stated parts, steps or components, but does not exclude the presence of one or more additional parts, steps or components.

Reference to an item by the indefinite article "a" or "an" does not exclude the possibility that more than one of the item(s) is present, unless the context clearly requires that there be one and only one of the items. The indefinite article "a" or "an" thus usually means "at least one".

BRIEF DESCRIPTION OF THE DRAWINGS

In the accompanying drawings:

In FIG. 1, a permeate carrier (24) is attached to permeate collection tube (12) having perforations (14). A stack of alternate membrane envelopes (26) and permeate carriers (24) are aligned on the permeate collection tube (12). The membrane envelopes (26) comprise a rectangular membrane sheet (18) folded around a feed spacer (16) and the folded edge of the membrane envelope abuts the permeate collection tube (12). The stack is then wound around the permeate collection tube (12) to provide a membrane structure comprising two parallel end faces and a third face of circular cross-section. Adjacent membrane envelopes (26) are adhered together such that feed gas passing from the left to the right in FIG. 1 can pass along the feed carriers (16) but cannot enter the permeate carriers (24) without first passing through the walls of membranes (18). In a preferred embodiment (not shown), in place of each permeate carrier (24) there is used a permeate envelope comprising two permeate spacers and a gas-impermeable sheet, wherein the gas-impermeable sheet is located between the two permeate spacers. Feed gas may be prevented from entering the permeate carriers (24) without first passing through the membranes (18) by depositing adhesive (sometimes called a "glue line") along the left and right outside edges of the membrane envelopes (26), thereby forming a gas-tight seal.

Referring to FIG. 2, a spiral wound gas filtration module according to the present invention is designated generally by the numeral (10). The module has a central permeate collection tube (12) having perforations (14) along its length. Membrane envelope (26) is wound about the permeate collection tube (12). Each membrane envelope is oriented to present an edge generally adjacent the tube (12), a pair of side edges and an axial edge distal from the tube and oriented to be in parallel with the axis of the tube. A liquid adhesive (36) is provided along three of the outer sides of each the membrane envelope (26) in order to provide a gas-tight seal between each membrane envelope and the next. The fourth side of each membrane envelope (26) is open (i.e. no liquid adhesive is applied) for gas communication with the permeate collection tube (12). Permeate carriers (24), membrane sheets (18), and feed spacers (16) are thus spirally wound around permeate collection tube (12) with permeate carriers (24) located adjacent tube (12) and in gas communication therewith. Referring to the series of layers of membrane sheet (18), feed spacer (16) and a second membrane sheet (18) as a membrane envelope (26), typically a stack of membrane envelopes (26) are spirally wound about permeate tube (12) with a permeate carrier (24) located between adjacent membrane envelopes. The module may optionally be formed without permeate carriers (24). During preparation of the modules, the adhesive (36) may be partially cured before the various layers are wound onto the permeate collection tube (12) and then heated after winding to further cure the adhesive (36).

FIG. 3 shows a V test strip of adhesive used to measure tensile E-modulus and elongation at break by ASTM method D638-03. The V test strip is shown on the left and rule (3) on the right provides scale to the V test strip. The V test strip comprises rectangular end portions (1) at each end and a central portion (2) which is 4 mm wide and 75 mm long. The rectangular end portions (1) are gripped in the jaws of the tensile stress measuring machine and are slowly pulled apart at a speed of 30 millimeters/minute, stretching the central portion (2) until it breaks. The tensile stress measuring machine provides the results for the tensile E-modulus and elongation at break.

Figure 1:
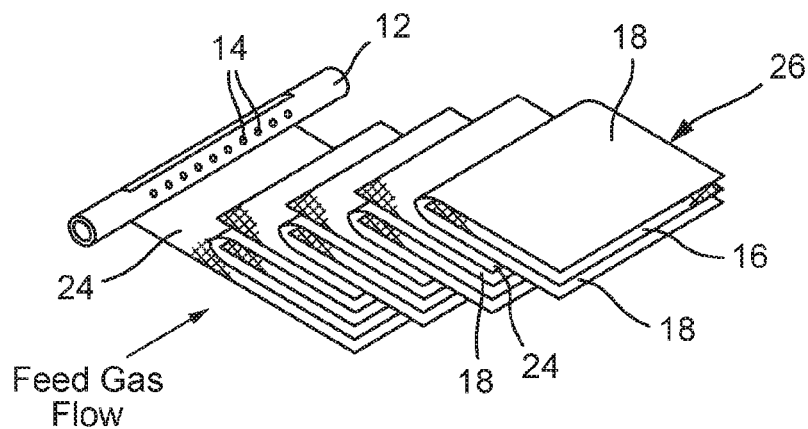
FIG. 1 illustrates how a membrane stack and module according to the present invention may be prepared.
Figure 2:
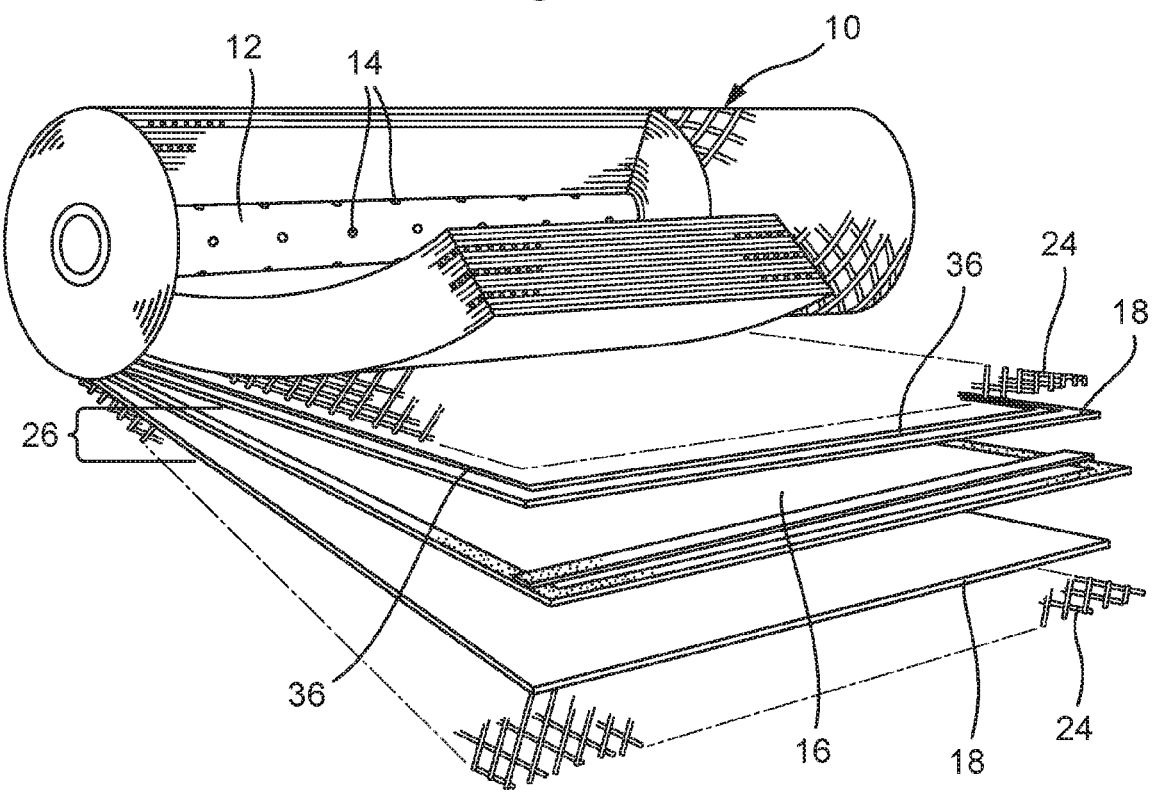
FIG. 2 is a partially exploded, perspective view of a gas filtration module according to the present invention.

The membrane envelope stacks comprise at least two membrane envelopes, e.g. from 2 to 30, preferably from 10 to 25 membrane envelopes.

The function of the permeate collection tube is to collect the permeate gas which has passed through the membranes. Thus the membrane envelopes and permeate carriers are arranged such that the permeate can flow through perforations in the permeate collection tube and the retentate cannot reach the perforations because it does not pass through the membranes.

The perforations along the length of the permeate collection tube allow permeate gas to flow from the exterior of tube to the interior. Surrounding the permeate tube and in gas communication therewith there is typically is a permeate carrier. The permeate carrier provides a gap between the membrane envelopes through which permeate gas may flow.

The permeate collection tube is typically constructed of a rigid material, for example a metal (e.g. stainless steel) or a plastic.

Preferably the membrane envelopes comprise one or more membrane sheets and optionally a feed spacer sandwiched between the membrane sheet(s).

Typically the membrane sheets are composite membranes, e.g. comprising a discriminating layer and a porous support. The function of the discriminating layer is to preferentially discriminate between gases, separating a feed gas mixture into a permeate which passes through the membrane (from the inside of the membrane envelope to the outside of the membrane envelope) and a retentate which does not pass through the membrane. The permeate and retentate typically comprise the same gases as the feed gas mixture, but one is enriched in at least one of the gases present in the feed gas and the other is depleted in that same gas.

The porous support is typically open pored, relative to the discriminating layer. The porous support may be, for example, a microporous organic or inorganic membrane, or a woven or non-woven fabric. The porous support may be constructed from any suitable material. Examples of such materials include polysulfones, polyethersulfones, polyimides, polyetherimides, polyamides, polyamideimides, polyacrylonitrile, polycarbonates, polyesters, polyacrylates, cellulose acetate, polyethylene, polypropylene, polyvinylidenefluoride, polytetrafluoroethylene, poly(4-methyl 1-pentene) and especially polyacrylonitrile.

One may use, for example, a commercially available, porous sheet material as the support. Alternatively one may prepare the porous support using techniques generally known in the art for the preparation of microporous materials. In one embodiment one may prepare a porous, non-discriminatory support by curing curable components, then applying further curable components to the formed porous support and curing such components thereby forming the layer of cured polymer and the discriminating layer on the already cured porous support.

One may also use a porous support which has been subjected to a corona discharge treatment, glow discharge treatment, flame treatment, ultraviolet light irradiation treatment or the like, e.g. for the purpose of improving its wettability and/or adhesiveness.

The porous support preferably has an average pore size of at least about 50% greater than the average pore size of the discriminating layer, more preferably at least about 100% greater, especially at least about 200% greater, particularly at least about 1000% greater than the average pore size of the discriminating layer.

The pores passing through the porous support typically have an average diameter of 0.001 to 10 µm, preferably 0.01 to 1 µm (i.e. before the porous support has been converted into a composite membrane). The pores at the surface of the porous support will typically have a diameter of 0.001 to 0.1 µm, preferably 0.005 to 0.05 µm. The pore diameter may be determined by, for example, viewing the surface of the porous support by scanning electron microscopy ("SEM") or by cutting through the support and measuring the diameter of the pores within the porous support, again by SEM.

The porosity at the surface of the porous support may also be expressed as a % porosity, i.e.

$$\% \text{ porosity} = 100\,\% \times \frac{\text{(area of the surface which is missing due to pores)}}{\text{(total surface area)}}$$

The areas required for the above calculation may be determined by inspecting the surface of the porous support using a SEM. Thus, in a preferred embodiment, the porous support has a % porosity >1%, more preferably >3%, especially >10%, more especially >20%.

The porosity of the porous support may also be expressed as a $CO_2$ gas permeance (units are $m^3(STP)/m^2 \cdot s \cdot kPa$). When the composite membrane is intended for use in gas separation the porous support preferably has a $CO_2$ gas permeance of 5 to $150 \times 10^{-5}$ $m^3(STP)/m^2 \cdot s \cdot kPa$, more preferably of 5 to 100, most preferably of 7 to $70 \times 10^{-5}$ $m^3(STP)/m^2 \cdot s \cdot kPa$.

Alternatively the porosity is characterised by measuring the $N_2$ gas flow rate through the porous support. Gas flow rate can be determined by any suitable technique, for example using a Porolux™ 1000 device, available from Porometer.com. Typically the Porolux™ 1000 is set at the maximum pressure (about 34 bar) and one measures the flow rate (L/min) of $N_2$ gas through the porous support under test. The $N_2$ flow rate through the porous support at a pressure of about 34 bar for an effective sample area of 2.69 $cm^2$ (effective diameter of 18.5 mm) is preferably >1 L/min, more preferably >5 L/min, especially >10 L/min, more especially >25 L/min. The higher of these flow rates are preferred because this reduces the likelihood of the gas flux of the resultant composite membrane being reduced by the porous support.

The abovementioned % porosity and permeance refer to the porous support used to make the composite membrane.

The porous support preferably has an average thickness of 20 to 500 μm, preferably 50 to 400 μm, especially 100 to 300 μm.

One may use an ultrafiltration membrane as the porous support, e.g. a polysulfone ultrafiltration membrane, cellulosic ultrafiltration membrane, polytetrafluoroethylene ultrafiltration membrane, polyvinylidenefluoride ultrafiltration membrane and especially polyacrylonitrile ultrafiltration membrane. Asymmetric ultrafiltration membranes may be used, including those comprising a porous polymer membrane (preferably of thickness 10 to 150 μm, more preferably 20 to 100 μm) and optionally a woven or non-woven fabric support. The porous support is preferably as thin as possible, provided it retains the desired structural strength.

Typically the discriminating layer is present on one side of the porous support or is partially or wholly within the porous support.

Preferred discriminating layers comprise a polyimide, especially a polyimide having —$CF_3$ groups. Polyimides comprising —$CF_3$ groups may be prepared by, for example, the general methods described in U.S. Pat. Reissue No. 30,351 (based on U.S. Pat. No. 3,899,309) U.S. Pat. Nos. 4,717,394 and 5,085,676. Typically one or more aromatic dianhydrides, preferably having —$CF_3$ groups, are condensed with one or more diamines. The diamine(s) and dianhydride(s) copolymerise to form an AB-type copolymer having alternating groups derived from the diamine(s) and dianhydride(s) respectively.

Preferably the discriminating layer comprises groups of the Formula (1) wherein Ar is an aromatic group and R is a carboxylic acid group, a sulphonic acid group, a hydroxyl group, a thiol group, an epoxy group or an oxetane group:

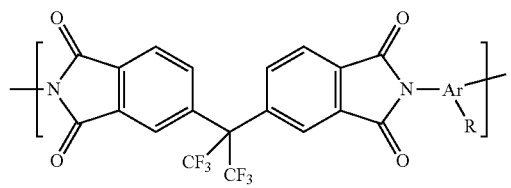

Formula (1)

Optionally there may be a polymeric layer between the porous support and the discriminating layer, often referred to as a gutter layer. Preferred gutter layers comprise a dialkylsiloxane.

Preferably the membrane stack comprises a plurality of membrane envelopes and permeate spacers, wherein the permeate spacers are located between the membrane envelopes. The permeate spacers typically have a relatively large mesh size to allow the permeate gas to travel to the permeate collection tube. In most instances, permeate spacers will be utilized, but it is possible to construct a module without permeate spacers. In general, a permeate spacer is formed of any inert material which maintains a space between the membrane envelopes. Further, the feed spacer (which is part of the membrane envelope) allows the gas to be filtered (or separated) to travel axially along the membrane module.

Preferred materials for the permeate carrier and feed spacer are open, channel forming grid materials, such as polymeric grid, or corrugated or mesh materials. Preferred among these are polypropylene and other polyolefin netting materials.

Typically the edges of adjacent membrane sheets which lie along the axial length of permeate tube are sealed so that gas flowing through feed spacer screen is prevented from access to permeate tube. Alternatively, the membrane sheet may be folded with the fold being adjacent to the permeate tube and with feed spacer located within the fold such that membrane surfaces face one another. In this case, only one membrane sheet is needed per membrane envelope.

The permeate carrier (when present) and the membrane envelopes are preferably spiral wound around a permeate collection tube with the permeate carrier in gas communication with the permeate collection tube. Referring to the series of layers of membrane sheet, feed spacer and a second membrane sheet as a membrane envelope, typically a plurality of membrane envelopes are spiral wound about a permeate tube with a permeate spacer (e.g. a screen) located between each envelope.

After the membrane envelopes and optional permeate spacers have been wound around the permeate collection tube, the assembly may be held in a wound state using restraining bands or outer wraps, or a combination thereof. A preferred method for restraining the assembly is by filament winding, in which a glass fibre filament dipped in an epoxy resin is wound around the assembly and cured. The assemblies can then be loaded into a housing or pressure vessel which may be operated at a slight pressure drop across the module as the gas being filtered flows through. In operation, the feed gas to be filtered is introduced at one end face of the membrane module.

The feed gas travels axially along membrane module through the feed spacers in the membrane envelope(s). As the feed gas encounters the membrane walls, part of the feed gas (the permeate) passes through the membrane and into the space between the membrane envelopes, which space is preferably occupied by a permeate carrier. The permeate gas travels along the permeate carrier, eventually passing into permeate collection tube through the perforations. The permeate exits the module through the permeate collection tube and the retentate travels axially through the module along the feed spacer.

As will be appreciated, it is necessary to provide a gas-tight seal between adjacent membrane envelopes, with the exception of the edge adjacent to the permeate collection tube, in order to prevent the feed gas from entering the permeate carrier without first passing through a membrane wall of the membrane envelope.

The membrane envelope stack according to a first aspect of the present invention may be prepared by any suitable method, for example by a method comprising:
(a) providing a plurality of membrane envelopes;
(b) stacking the plurality of membrane envelopes and bonding the membrane envelopes together by means of a partially cured adhesive, optionally also providing a permeate spacer between each membrane envelope; and
(c) curing the partially cured adhesive to give a cured adhesive;
wherein the cured adhesive has a tensile E-modulus of at least 1600 N/mm$^2$ and/or an elongation at break of 20% or less and/or a Tg of at least 50° C.

The above process forms a third aspect of the present invention.

The present invention also provides a method for preparing a spiral wound gas filtration module comprising the steps:
(i) providing a permeate collection tube having perforations;
(ii) providing a membrane envelope stack comprising membrane envelopes bonded together by means of a partially cured adhesive;
(iii) winding the membrane envelope stack comprising the partially cured adhesive about the permeate collection tube; and
(iv) curing the partially cured adhesive to give a cured adhesive;
wherein the cured adhesive has a tensile E-modulus of at least 1600 N/mm$^2$ and/or an elongation at break of 20% or less and/or a Tg of at least 50° C.

In the methods according to the present invention, the adhesive may be applied as a glue line along (or near) three edges on the outside faces of the membrane envelopes, e.g. near to the edges of the permeate carrier and/or the membrane sheet(s). In this way, three sides of each membrane envelope (typically two long sides and one short side) are adhered to the next membrane envelope in a gas-tight manner, with the fourth side (typically a short side) being open for gas communication with the permeate collection tube.

When partial curing or further curing of the adhesive (e.g. in step (iv)) is performed by a process comprising heating the adhesive, such heating will generally be performed at a temperature which does not damage any components of the membrane envelope. The membranes can in some cases be temperature sensitive and so high curing temperatures should generally be avoided, depending on the properties of the membrane(s).

Partial curing of the adhesive can be advantageous because it increases viscosity of the adhesive, thereby making step (iii) easier and less messy. As the adhesive is only partially (not fully) cured, the various layers can still move relative to one another during winding step (iii).

The partial curing of the adhesive is also useful because some movement of the layers to be adhered together is desirable during the subsequent winding step because the outer layers travel a further distance during winding than the inner layers. Thus the adhesive is preferably partially cured such that the membrane sheets are able to move relative to each other during winding step (iii).

The adhesive may be partially cured by heating or irradiating the adhesive. When partial cure is achieved by heating the adhesive, the temperature of the adhesive is preferably increased by less than 15° C., more preferably less than 5° C. or even not at all. Typically the adhesive is partially cured by a process comprising heating it to a temperature of at most 25° C.

Optionally the adhesive is partially cured by a process comprising ageing the adhesive for at least 30 minutes, preferably at least 60 minutes, more preferably at least 90 minutes, before performing winding step (iii).

The curing in step (b) or (iv) is typically performed by heating the membrane envelope to a temperature higher than that used to partially cure the adhesive and/or for a longer period than that used to partially cure the adhesive. For example, the heating to partially cure the adhesive preferably raises the temperature of the adhesive by at least 5° C., more preferably at least 10° C., especially at least 15° C. Preferably the heating in step to partially cure the adhesive is to a temperature below 70° C., more preferably below to a temperature below 50° C. (especially when the membrane comprises a polyacrylonitrile porous support).

A wide range of chemical types of adhesives may be used in the present method, including epoxy adhesives and/or polyurethane adhesives, provided that when the adhesive is cured it has a tensile E-modulus of at least 1600 N/mm$^2$ and/or an elongation at break of 20% or less and/or a Tg of at least 50° C. For multi-part adhesives, in order to achieve the required tensile E-modulus or an elongation at break one will need to select combinations of polymerisable substance and a hardening agent.

The adhesive is liquid when it is applied to one or more components of the membrane envelope. Preferably the adhesive is liquid at 20° C. The viscosity of the adhesive is not particularly limited and highly viscous liquid adhesives may be used, provided that they do not unduly hinder the winding in step (iii).

The E-modulus (also called the modulus of elasticity) may be measured using a tensile testing machine, for example by ASTM method D638.

Preferred adhesives have a tensile strength at break of at least 250 N. The tensile strength at break may also be measured by ASTM method D638.

Preferred adhesives have an elongation at break of 10% or less, preferably 5% or less. The elongation at break may also be measured by ASTM method D638.

Preferably the adhesive has a Tg 50° C., more preferably at least 55° C., especially at least 60° C., more especially at least 65° C., particularly at least 70° C. The Tg may be measured by differential scanning calorimetry using the method described in ISO-11357-2.

The abovementioned tensile E-modulus, elongation at break and Tg refer to the adhesive when cured.

The finding that the above elongation at break can be advantageous is surprising, particularly in view of the contrary teaching in '517 which states that it is essential for the adhesive to remain flexible when cured.

In a preferred embodiment the cured adhesive has glass-transition temperature of at least 60, 65, 70, 75, 80 or 85° C., a tensile E-modulus of at least 1600 N/mm$^2$, a maximum tensile strength at break of at least 250 N and an elongation at break of 20% or less.

Preferably the cured adhesive has a tensile E-modulus of at least 1750 N/mm$^2$, more preferably more than 2250 N/mm$^2$ and especially more than 3000 N/mm$^2$.

Preferably the cured adhesive has an elongation at break of less than 13%, more preferably 10% or less, and especially 5% or less.

Preferred adhesives are multi-part adhesives, typically comprising a polymerisable substance and a hardening agent. When the two parts are mixed, typically shortly before use, an adhesive is formed by, for example, a crosslinking reaction. Conveniently one may choose combinations of the parts which cure faster in step (b) or (iv) (when heated) than in step (a) or (iii), allowing a sufficient opentime for the winding to proceed in step (iii).

Preferred epoxy adhesives comprise, as polymerisable substance, an epoxy resin. Suitable epoxy resins are based on a bisphenol, e.g. bisphenol A, bisphenol F, bisphenol AF, bisphenol S; fluorinated epoxy resins; polyglycidyl ethers of polyglycols; polyglycidyl esters of polycarboxylic acids; cycloaliphatic epoxy resins; epoxy phenol novolac resins; epoxy cresol novolac resins; glycidylamine epoxy resins; tris(glycidyloxyphenyl)methane; tetrakis(glycidyloxyphenyl)ethane and tetraglycidyl diaminodiphenylmethane; and mixtures comprising two or more of the foregoing.

Preferred hardening agents include polyamines (e.g. aliphatic, cycloaliphatic, aromatic and heterocyclic polyamines and polyaminoamides); anhydrides (e.g. aliphatic and cycloaliphatic anhydrides); polyphenols (e.g. polyphenylene; dicyanodiamide and polythiols.

The adhesives optionally comprise further additives, e.g. a retarder, plasticizer, diluent, rheology adjuvant, thixotropy-conferring agent, thickener, wetting agent, adhesion promoter, aging protection agent and/or stabilizer.

Preferably the membranes have a $CO_2/CH_4$ selectivity ($\alpha CO_2/CH_4$)>10. Preferably the selectivity is determined by a process comprising exposing the membrane to a 13/87 mixture by volume of $CO_2$ and $CH_4$ at a feed pressure of 6000 kPa at 40° C.

The method of the present invention is particularly useful for preparing spiral wound gas filtration modules for separating a gas into a retentate portion and a permeate portion, comprising a membrane envelopes stack according to the first aspect of the present invention, optionally one or more permeate carriers, and a permeate collection tube having perforations along its length, said envelope stack and permeate carriers (when present) being wound around the carrier tube.

While this specification emphasises the usefulness of the membrane envelope stacks and modules of the present invention for separating gases, especially polar and non-polar gases, it will be understood that the they can also be used for other purposes, for example providing a reducing gas for the direct reduction of iron ore in the steel production industry, dehydration of organic solvents (e.g. ethanol dehydration), pervaporation, oxygen enrichment, solvent resistant nanofiltration and vapour separation.

The membrane envelope stacks and modules of the invention may be used in conjunction with other gas separation techniques if desired, e.g. with solvent absorption (e.g. Selexol, Rectisol, Sulfinol, Benfield), amine absorption (e.g. DEA, MDEA), physical adsorption, e.g. pressure swing adsorption, cryogenic techniques, etc.

The membrane envelope stacks and modules according to the invention are particularly useful for the separation of a feed gas (which includes a feed vapour) containing a target gas into a gas stream rich in the target gas and a gas stream depleted in the target gas. For example, a feed gas comprising polar and non-polar gases may be separated into a gas stream rich in polar gases and a gas stream depleted in polar gases. In many cases the membranes have a high permeability to polar gases, e.g. $CO_2$, $H_2S$, $NH_3$, $SO_x$, and nitrogen oxides, especially $NO_x$, relative to non-polar gases, e.g. alkanes, $H_2$, $N_2$, and water vapour.

The target gas may be, for example, a gas which has value to the user of the membrane and which the user wishes to collect. Alternatively the target gas may be an undesirable gas, e.g. a pollutant or 'greenhouse gas', which the user wishes to separate from a gas stream in order to meet product specification or to protect the environment.

The membrane envelope stacks and modules according to the invention are particularly useful for purifying natural gas (a mixture which predominantly comprises methane) by removing polar gases ($CO_2$, $H_2S$); for purifying synthesis gas; and for removing $CO_2$ from hydrogen and from flue gases. Flue gases typically arise from fireplaces, ovens, furnaces, boilers, combustion engines and power plants. The composition of flue gases depend on what is being burned, but usually they contain mostly nitrogen (typically more than two-thirds) derived from air, carbon dioxide ($CO_2$) derived from combustion and water vapour as well as oxygen. Flue gases also contain a small percentage of pollutants such as particulate matter, carbon monoxide, nitrogen oxides and sulphur oxides. Recently the separation and capture of $CO_2$ has attracted attention in relation to environmental issues (global warming).

The membrane envelope stacks and modules according to the invention are particularly useful for separating the following: a feed gas comprising $CO_2$ and $N_2$ into a gas stream richer in $CO_2$ than the feed gas and a gas stream poorer in $CO_2$ than the feed gas; a feed gas comprising $CO_2$ and $CH_4$ into a gas stream richer in $CO_2$ than the feed gas and a gas stream poorer in $CO_2$ than the feed gas; a feed gas comprising $CO_2$ and $H_2$ into a gas stream richer in $CO_2$ than the feed gas and a gas stream poorer in $CO_2$ than the feed gas, a feed gas comprising $H_2S$ and $CH_4$ into a gas stream richer in $H_2S$ than the feed gas and a gas stream poorer in $H_2S$ than the feed gas; and a feed gas comprising $H_2S$ and $H_2$ into a gas stream richer in $H_2S$ than the feed gas and a gas stream poorer in $H_2S$ than the feed gas.

EXAMPLES

Preparation of the Adhesives

Adhesives were prepared by mixing the polymeric substances and the hardening agents mentioned in Table 1 at room temperature, in a weight ratio of 1:1. The polymeric substances further comprised 3.5 wt % of fumed silica.

The Aradur, Fermadur, Epikure and Ancamide, 2216a and UR3543a hardening agents were obtained from Huntsman, Sonderhoff, Momentive, Air Products, 3M respectively The Araldite polymerisable substance (epoxy and polyurethane adhesives) were obtained from Huntsman. Other polyurethane adhesives used were LA115-13-5 from Sonderhoff and UR3543 from HBFuller.

Further an epoxy resin adhesive 2216 polymerisable substance was used (obtained from 3M).

Measurement of Tg

Figure 3:
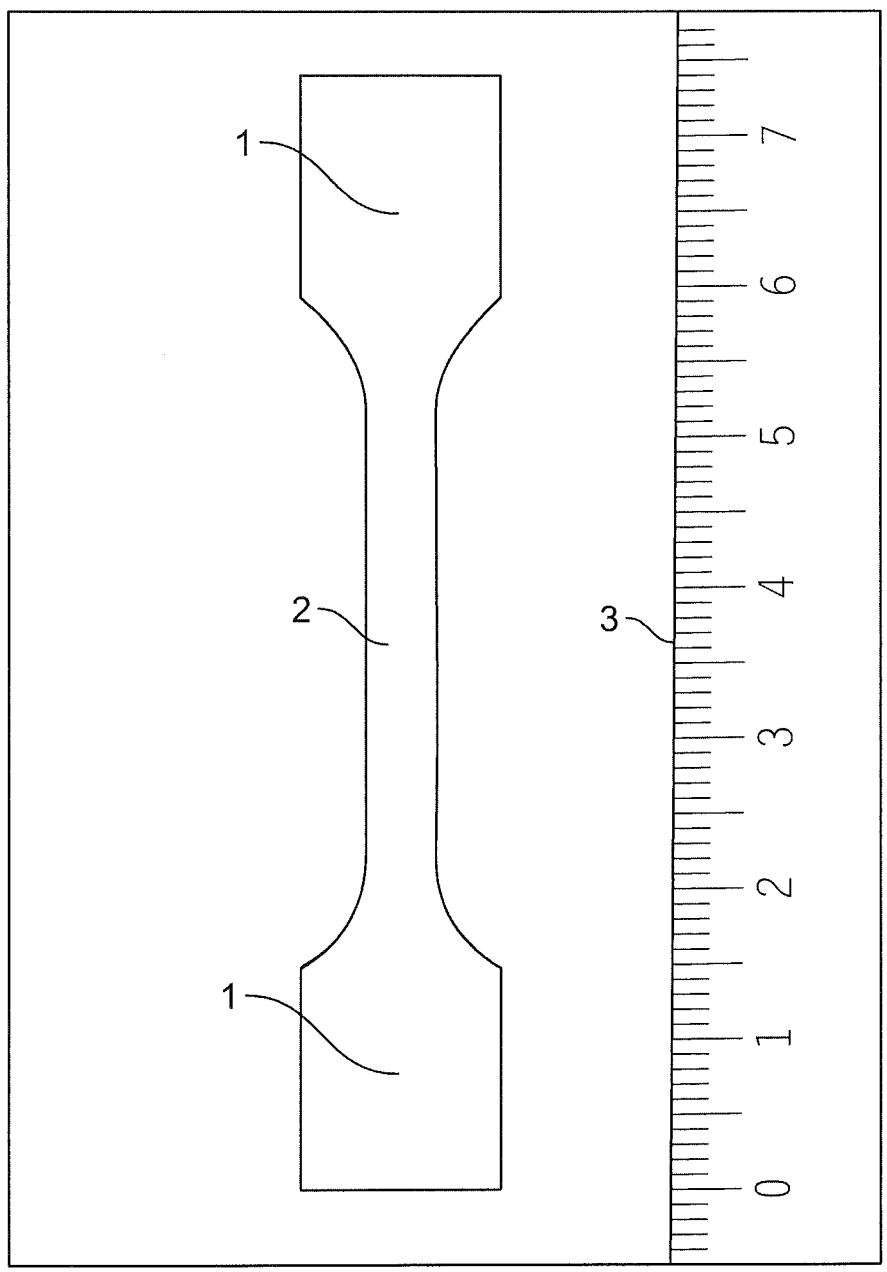
FIG. 3 shows a V test strip of adhesive used to measure tensile E-modulus and elongation at break.

The adhesives described in Table 1 were cast in a mould in a shape according type V strips of with a $W_c$=4 mm/LO=75 mm as described in ASTM D 638-03, as shown in FIG. 3.

In order to measure Tg, these samples were cured in two steps, the first step by allowing the adhesive to cure for 16 hrs at room temperature and the second step by heating for a further 16 hrs at 50° C. The Tgs of the cured adhesives (5g) were measured by differential scanning calorimetry by the method of described in ISO-11357-2 using a Mettler Toledo DSC 823e (Mettler Toledo B.V., Nederland) as follows: The DSC test chamber was purged with nitrogen gas at a flow rate of 50 cm$^3$ per minute. The following temperature profile was used for determining the (midpoint) Tg: An isotherm of 5 minutes at 10° C. A first run of between 10 and 150° C. with a speed of 20° C. per minute, cooling down from 150° C. to 10° C. with a speed of 20° C. per minute. A subsequent second run was performed using the same profile as for the previous run. The resultant Tgs are shown in Table 1.

Measurement of Tensile E-Modulus, Tensile Strength at Break and Elongation at Break The tensile E-Modulus, tensile strength at break and elongation at break measurements were performed on samples of cured adhesive prepared as described above in the Tg measurement section above. These properties were measured using a Zwick Z010 4 millimetre type V test strips as per ASTM method D638 at 22° C., relative humidity of 50% and using a crosshead speed of 30 millimeters/minute. The results are shown in Table 1.

Assessment of Blister-Formation

The level of blister formation was measured on simulated membrane envelope stacks as follows:

Identical first and second membranes were prepared by applying a dialkylsiloxane gutter layer to a polyacrylonitrile porous support, followed by the application of a polyimide discriminating layer. The membranes had a thickness of <1.5 µm, as judged by scanning electron microscopy.

As permeate carrier there was used an epoxy-coated, warp knitted tricot fabric of thickness 0.33 mm and weight of 105-117 g/m$^2$, coated with epoxy.

Simulated membrane envelope stacks were prepared as follows. The adhesives mentioned in Table 1 under test (2 cm$^3$) were applied sample of the first membrane sheet (50 mm×100 mm dimension). Two samples of the permeate carriers of similar dimensions was applied to the side of the first membrane carrying the adhesive. A sample of the second membrane sheet (50 mm×100 mm dimension) was then placed on top of the to match its orientation, such that the permeate carriers were sandwiched between the two membrane sheets and such that the adhesive penetrated through the permeate carriers so that the permeate carriers and both membrane sheets were in contact with the adhesive and could be cured as a whole. A weight of 1 kg was applied on top and the adhesive was partially cured (for at least 16 hrs at room temperature). The adhesive was then further cured by heating at 50° C. for 16 hours in an oven to give a simulated membrane envelope stack.

The simulated membrane envelope stack was then inflated to a pressure of 6,000 kPa with a simulated natural gas containing 13% $CO_2$, 87% $CH_4$ and traces of toluene and exposing the inflated simulated membrane envelope stack to a temperature of 50° C. for 16 hours. The simulated natural gas was released from the simulated membrane envelope stack and the stack was allowed to cool to room temperature, then examined for the formation of blisters. The result of these tests is shown in the final column of Table 1 below.

TABLE 1

| Example | Type cured adhesive | Adhesive Polymerisable Substance | Hardening Agent | Partial cure step (temp. and time) | Further cure step (temp. and time) | Tg (° C.) | Tensile E-modulus (N/mm$^2$) | Elongation at break (%) | Blister level |
|---|---|---|---|---|---|---|---|---|---|
| 1 | Epoxy | Araldite ™ GY250 | Aradur ™ 140 | 16 hr at 20° C. | 16 hr at 50° C. | 78 | 1812 | 2.3 | + |
| 2 | Epoxy | Araldite ™ GY250 | Aradur ™ 2973 | 16 hr at 20° C. | 16 hr at 50° C. | 65 | 2743 | 3.4 | + |
| CEx1 | Epoxy | Araldite ™ GY250 | Aradur ™ 70 | 16 hr at 20° C. | 16 hr at 50° C. | 47 | 7 | 187.2 | − |
| CEx2 | Epoxy | Araldite ™ GY250 | Aradur ™ 3275 | 16 hr at 20° C. | 16 hr at 50° C. | 40 | 104 | 70.5 | −− |
| 3 | Epoxy | Araldite ™ GY250 | Epikure ™ 3155 | 16 hr at 20° C. | 16 hr at 50° C. | 58 | 1797 | 3.1 | + |
| CEx3 | Epoxy | Araldite ™ GY250 | Epikure ™ 3164 | 16 hr at 20° C. | 16 hr at 50° C. | 37 | 1526 | 21.3 | − |
| 4 | Epoxy | Araldite ™ GY250 | Epikure ™ 3140 | 16 hr at 20° C. | 16 hr at 50° C. | 66 | 2599 | 2.9 | + |
| 5 | Epoxy | Araldite ™ GY250 | Epikure ™ 3055 | 16 hr at 20° C. | 16 hr at 50° C. | 60 | 2139 | 3.6 | + |
| CEx4 | Epoxy | 3M 2216 base | 3M 2216 a | 16 hr at 20° C. | 16 hr at 50° C. | 49 | 335 | 67.1 | −− |
| 6 | Epoxy | Araldite ™ GY250 | Ancamide ™ 2353 | 16 hr at 20° C. | 16 hr at 50° C. | 75 | 2378 | 1.9 | + |
| CEx5 | Epoxy | 3M 2216 base | Aradur ™ 3275 | 16 hr at 20° C. | 16 hr at 50° C. | 49 | 212 | 67.1 | −− |
| 7 | Epoxy | 3M 2216 base | Aradur ™ 140 | 16 hr at 20° C. | 16 hr at 50° C. | 66 | 2359 | 3.2 | + |
| CEx6 | Epoxy | Araldite ™ GY250 | 3M 2216 a | 16 hr at 20° C. | 16 hr at 50° C. | 21 | 93 | 103.7 | −− |
| CEx7 | Polyurethane | Sonderhoff LA115-13-5 | Sonderhoff Fermadur ™ B-N | 16 hr at 20° C. | 16 hr at 50° C. | 14 | 57 | 46.0 | −− |
| CEx8 | Polyurethane | Araldite ™ XD4465 | XD4782 | 16 hr at 20° C. | 16 hr at 50° C. | 21 | 41 | 45.3 | −− |

(blister formation: + = no blister, − = moderate amount of blisters, −− = many blisters)

The invention claimed is:

1. A membrane envelope stack for gas separation comprising membrane envelopes bonded together by means of an adhesive having a tensile E-modulus of at least 1600 N/mm$^2$ and an elongation at break of 20% or less and/or a Tg of at least 50° C., wherein:
   (i) the membrane envelopes comprise one or more membrane sheets and optionally a feed spacer sandwiched between the membrane sheet(s);
   (ii) the membrane sheet(s) are composite membranes comprising a discriminating layer and a porous support; and
   (iii) the tensile E-Modulus, tensile strength at break and elongation at break measurements are as measured on samples of cured adhesive using a Zwick Z010 4millimeter type V test strips as per ASTM method D638 at 22° C., relative humidity of 50% and using a crosshead speed of 30 millimeters/minute.

2. The membrane envelope stack according to claim 1 wherein the adhesive has an elongation at break of 20% or less.

3. The membrane envelope stack according to claim 1 wherein the adhesive has a Tg of at least 50° C.

4. The membrane envelope stack according to claim 1 wherein the adhesive has a tensile E-modulus of at least 1600 N/mm$^2$, an elongation at break of 20% or less and a Tg of at least 50° C.

5. The membrane envelope stack according to claim 1 wherein the discriminating layer(s) comprise a polyimide having —$CF_3$ groups.

6. The membrane envelope stack according to claim 1 wherein the discriminating layer(s) comprise groups of the Formula (1) wherein Ar is an aromatic group and R is a carboxylic acid group, a sulphonic acid group, a hydroxyl group, a thiol group, an epoxy group or an oxetane group:

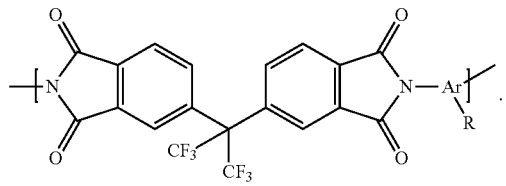

Formula (1)

7. The membrane envelope stack according to claim 1 wherein the adhesive is a multi-part adhesive comprising a polymerisable substance and a hardening agent.

8. A spiral wound gas filtration module comprising a membrane envelope stack according to claim 1.

9. A method for preparing a membrane envelope stack according to claim 1 comprising:
   (a) providing a plurality of membrane envelopes;
   (b) stacking the plurality of membrane envelopes and bonding the membrane envelopes together by means of a partially cured adhesive, optionally also providing a permeate spacer between each membrane envelope; and
   (c) curing the partially cured adhesive to give a cured adhesive;
wherein the cured adhesive has a tensile E-modulus of at least 1600 N/mm² and an elongation at break of 20% or less and/or a Tg of at least 50° C.

10. The method for preparing a spiral wound gas filtration module according to claim 8 comprising the steps:
   (i) providing a permeate collection tube having perforations;
   (ii) providing a membrane envelope stack comprising membrane envelopes bonded together by means of a partially cured adhesive;
   (iii) winding the membrane envelope stack comprising the partially cured adhesive about the permeate collection tube; and
   (iv) curing the partially cured adhesive to give a cured adhesive;
wherein the cured adhesive has a tensile E-modulus of at least 1600 N/mm² and an elongation at break of 20% or less and/or a Tg of at least 50° C.

11. A process for separation of a feed gas containing a target gas into a gas stream rich in the target gas and a gas stream depleted in the target gas comprising passing the feed gas through a module according to claim 8.

12. The membrane envelope stack according to claim 1 wherein the adhesive is a multi-part adhesive comprising a polymerisable substance and a hardening agent and the discriminating layer(s) comprise a polyimide having —$CF_3$ groups.

13. The membrane envelope stack according to claim 1 wherein the adhesive is a multi-part adhesive comprising a polymerisable substance and a hardening agent and the discriminating layer(s) comprise groups of the Formula (1) wherein Ar is an aromatic group and R is a carboxylic acid group, a sulphonic acid group, a hydroxyl group, a thiol group, an epoxy group or an oxetane group:

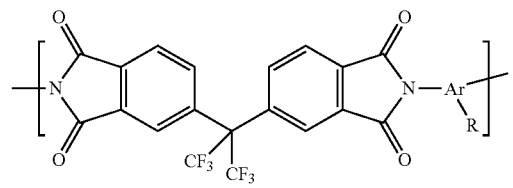

Formula (1)

14. A spiral wound gas filtration module comprising a membrane envelope stack according to claim 1.

15. A spiral wound gas filtration module comprising a membrane envelope stack according to claim 1 wherein the adhesive is a multi-part adhesive comprising a polymerisable substance and a hardening agent and the discriminating layer(s) comprise a polyimide having —$CF_3$ groups.

16. The method according to claim 9 wherein the cured adhesive has a tensile E-modulus of at least 1600 N/mm², an elongation at break of 20% or less and a Tg of at least 50° C.

17. The method according to claim 9 wherein the adhesive is a multi-part adhesive comprising a polymerisable substance and a hardening agent and the discriminating layer(s) comprise a polyimide having —$CF_3$ groups.

18. The method according to claim 10 wherein the cured adhesive has a tensile E-modulus of at least 1600 N/mm², an elongation at break of 20% or less and a Tg of at least 50° C.

* * * * *